US005354395A

United States Patent [19]

Fernandez et al.

[11] Patent Number: 5,354,395

[45] Date of Patent: Oct. 11, 1994

[54] PROCESS FOR THE MANUFACTURE OF A TOURISTIC AND/OR PERSONAL VISITING CARD ORNAMENTED WITH PLANTS OR ANY SIMILAR MATERIAL

[76] Inventors: Jose M. Fernandez; Angeles Albanchez, both of Mayor, 90, 02440 Molinicos (Albacete), Spain

[21] Appl. No.: 81,425

[22] Filed: Jun. 22, 1993

[30] Foreign Application Priority Data

Jul. 9, 1992 [ES] Spain .................................. 9201422

[51] Int. Cl.$^5$ .......................... A01N 3/00; B44C 3/02

[52] U.S. Cl. .................................... 156/57; 156/298; 156/308.2; 156/312; 428/17; 428/22; 428/24

[58] Field of Search ............... 428/17, 22, 24; 156/57, 156/63, 298, 300, 308.2, 309.6, 312; 434/295, 296, 297

[56] References Cited

U.S. PATENT DOCUMENTS

| | | | |
|---|---|---|---|
| 1,084,858 | 1/1914 | Heeren | 156/57 |
| 3,298,881 | 1/1967 | Higley et al. | 434/296 X |
| 4,885,037 | 12/1989 | Ohkubo | 156/57 |
| 5,176,519 | 1/1993 | Albanchez Matiaci et al. | 434/295 |

FOREIGN PATENT DOCUMENTS

| | | | |
|---|---|---|---|
| 0487736 | 12/1991 | European Pat. Off. | 156/57 |
| 5982302 | 5/1984 | Japan | 156/57 |
| 60-19600 | 1/1985 | Japan | 156/57 |
| 63-239091 | 10/1988 | Japan | 156/57 |
| 2210326 | 6/1989 | United Kingdom | 428/24 |

OTHER PUBLICATIONS

English abstract of Australian Patent 9065932 published Nov. 9, 1990.

*Primary Examiner*—Jeff H. Aftergut

*Attorney, Agent, or Firm*—Ostrolenk, Faber, Gerb & Soffen

[57] ABSTRACT

A process for manufacturing a card ornamented with a plant or another material. The card comprises a flexible sheet covered on both surfaces with sheets of plastic material that are thermowelded and a plant or other material is applied to the flexible sheet. The plant or other material is first subject to pressure, then dried at an ambient temperature, then subject to a disinfectant wash. The plant is adhered to the flexible sheet. The plastic sheets are placed over the flexible sheet and are thermowelded at an elevated temperature and pressure for sterilization, completing the card. Thermowelding the plastic sheets to the flexible sheet under pressure and temperature is effective for sterilizing the plant or other material.

7 Claims, 1 Drawing Sheet

PROCESS FOR THE MANUFACTURE OF A TOURISTIC AND/OR PERSONAL VISITING CARD ORNAMENTED WITH PLANTS OR ANY SIMILAR MATERIAL

BACKGROUND OF THE INVENTION

The present invention relates to a process for manufacturing a tourist and/or personal visiting card ornamented with a plant or any other material.

Forms and procedures are known for manufacturing tourist or visiting cards that are coated with plastic on one face, typically the front face. No cards are known that are coated with plastic on both faces and particularly, that have fixed between the plastic coatings, a plant or any granular material, for example a bird's feather, natural or artificial fibers or cloth, or any other natural or artificial material, metal or non-metal. At least some of these materials are of a type which carry microorganisms and should be sterilized.

With the invention, these materials can be incorporated on the surface of the front face of the card, even when the card is plastic coated, or on the margin of the body of the card between the two plastic coatings used to coat the whole card.

SUMMARY OF THE INVENTION

The procedure for producing such a coated card is described. Use a flexible sheet. Collect and then select the part or parts of a vegetable or natural plant or other material to be applied to the card. Press the plant under approximately 10 kg/cm2 and then perform a drying operation at ambient temperature. Wash the plant in a disinfectant solution, such as formol. Affix the plant to the supporting flexible sheet of the card.

The whole card is covered by two plastic sheets between which the plant is placed if it is desired to leave the flexible sheet that forms the support for the card. The two plastic sheets are thermowelded e.g. at a temperature of 165° C. under a pressure of 20 kg/cm2. This temperature may be necessary to sterilize the plant.

If metal or non-metallic material is used, the plastic coating of the flexible sheet is carried out directly with that material. Similarly, any type of material can be used with the flexible sheet, including granular or not, natural or artificial, metal or nonmetallic, manufactured or not manufactured.

In order to more easily understand the stages followed in the process of the invention, reference is made below to a practical example which does not limits the invention as shown in the attached drawings.

DETAILED DESCRIPTION OF THE PREFERRED EMBODIMENTS

Figure 1:
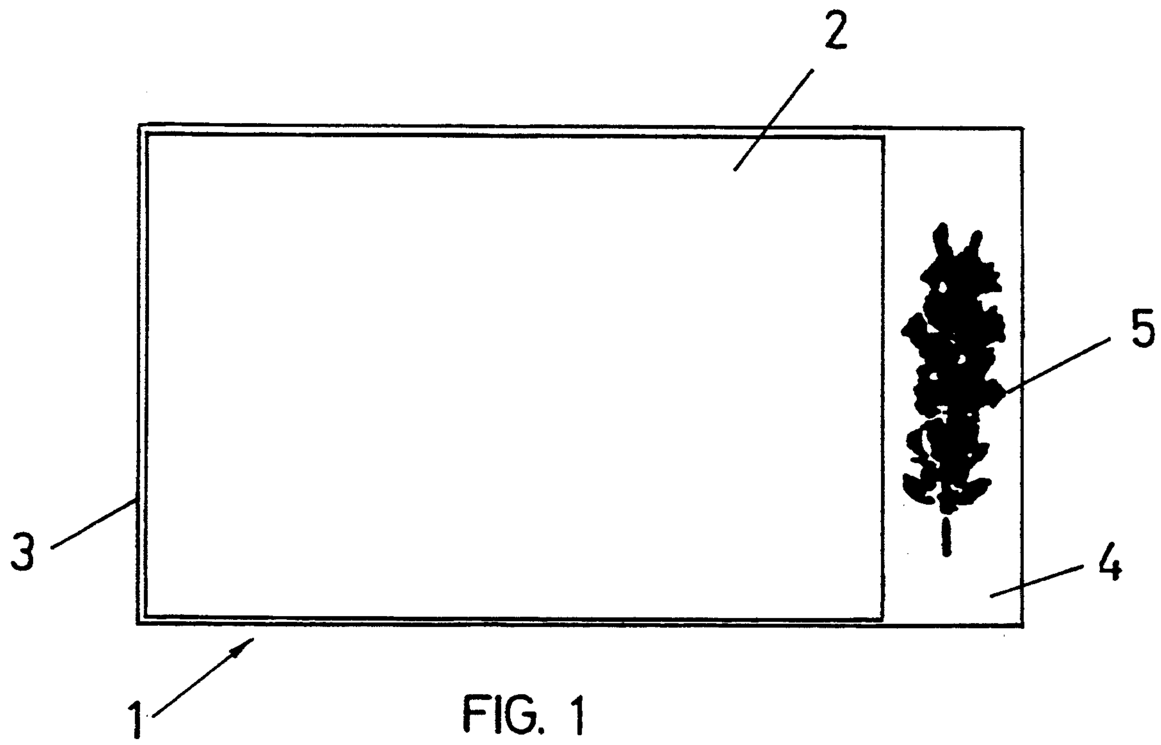
FIG. 1 shows a front view of the card of the invention.

The drawings show a card 1 that may be a visiting, tourist and/or personal card. It is formed from a flexible sheet 2 that has a plastic coating on it comprised of two sheets 3 of plastic, one at each opposite surface of the sheet 2.

The plastic sheets may be of greater length than the flexible sheet 2 they cover. In that case, on the corner area 4 of the card, a plant 5 is plastic coated, or any other material, granular or not, natural or artificial, metal or non-metallic may be coated there.

Figure 2:
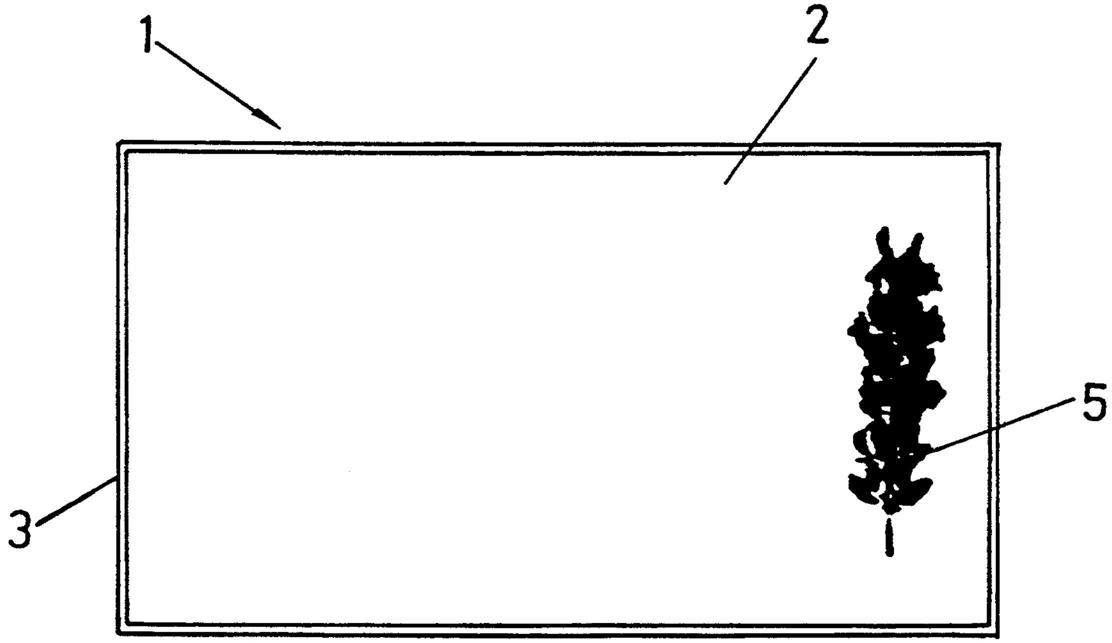
FIG. 2 shows a front view of a variation of the card version of FIG. 1.

FIG. 2 shows a flexible sheet 2 so placed and sized relative to the covering plastic sheets that the plant 5 is placed on one of the faces of the sheet 2 while the rest of the sheet is available to receive the usual characters of such a card: personal, commercial, business, tourist, etc.

Having sufficiently described the nature of the invention, and also the manner of putting it into practice, it should be noted that the above layouts represented in the attached drawings may be modified in their details provided the fundamental principle is not altered.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A process for manufacturing a card ornamented with a plant comprising:

collecting a plant to be applied on the card; applying a pressure of approximately 10 $kg/cm^2$ to the plant, drying the plant;

applying the plant on a flexible sheet; covering the opposite sides of the flexible sheet with a plastic sheet; and thermowelding together the sheets with the plant on the flexible sheet at a temperature of 165° C. and under a pressure of 20 $kg/cm^2$.

2. The process of claim 1, wherein the drying operation applied to the plant is at ambient temperature.

3. The process of claim 1, wherein following the application of pressure to the plant, washing the plant in a disinfectant solution.

4. The process of claim 3, wherein the disinfectant is formol.

5. The process of claim 1, wherein the plant is first adhered to the flexible sheet before the plastic sheets are applied over the plant and the flexible sheet.

6. The process of claim 5, wherein the plant is adhered by being glued to the flexible sheet.

7. A process for manufacturing a card ornamented with a plant comprising:

collecting a plant to be applied on the card;

applying a pressure of approximately 10 $kg/cm^2$ to the plant;

washing the plant in a disinfectant solution;

drying the plant at ambient temperature;

applying the plant on a flexible sheet;

covering the opposite sides of the flexible sheet with a plastic sheet; and thermowelding together the sheets with the plant on the flexible sheet at a temperature of 165° C. and under a pressure of 20 $kg/cm^2$.

* * * * *